United States Patent [19]

Raufast

[11] Patent Number: 4,495,337
[45] Date of Patent: Jan. 22, 1985

[54] PROCESS FOR THE BOTTOM DRAINAGE OF A FLUID-BED POLYMERIZATION REACTOR

[75] Inventor: Charles Raufast, Saint Julien Les Martigues, France

[73] Assignee: BP Chimie Societe Anonyme, Paris, France

[21] Appl. No.: 469,528

[22] Filed: Feb. 24, 1983

[30] Foreign Application Priority Data

Feb. 26, 1982 [FR] France .................................. 82 03204

[51] Int. Cl.$^3$ .................................................. C08F 2/00
[52] U.S. Cl. ................................... 526/88; 526/352; 526/918; 526/920
[58] Field of Search ............................ 526/88, 920, 918; 422/145

[56] References Cited

U.S. PATENT DOCUMENTS

| | | | |
|---|---|---|---|
| 2,550,741 | 5/1951 | Welty | 422/145 |
| 3,922,322 | 11/1975 | Dormenval et al. | 526/88 X |
| 4,302,565 | 11/1981 | Goeke et al. | 526/88 |

OTHER PUBLICATIONS

Chemical Engineers' Handbook, Perry & Chilton, (1973), 5th Edition; pp. 20–68, 20–69, 20–65.
Unit Operations of Chemical Engineering, McCabe and Smith, © 1967, p. 178.

*Primary Examiner*—Joseph L. Schofer
*Assistant Examiner*—S. Babajko
*Attorney, Agent, or Firm*—Brooks, Haidt, Haffner & Delahunty

[57] ABSTRACT

The invention relates to a device and process permitting of the bottom drainage of a fluid-bed polymerization reactor (1) comprising a fluidization plate (2), a gas inlet (3) located between the said plate and the bottom of the reactor and a side pipe (4) located above the said plate and permitting of the evacuation of the fluidized particles, the said device consisting:

of a vertical pipe (5) having a top opening at the level of the plate and a bottom end located outside and underneath the bottom of the reactor, which is occluded by a cock (6), and a gas intake tube (7) in the said vertical piping, leading out into the immediate vicinity of the said cock (6).

2 Claims, 3 Drawing Figures

PROCESS FOR THE BOTTOM DRAINAGE OF A FLUID-BED POLYMERIZATION REACTOR

The present invention relates to a device and process for effecting the bottom drainage of a fluid-bed polymerisation reactor.

It is known that one can polymerise in the gaseous state alpha-olefins such as ethylene, or mixtures of alpha-olefins such as ethylene, propylene, butene-1, in the presence of a catalytic composition comprising for example (a) a solid compound of a transition metal of sub-groups IVa, Va and VIa of the Periodic Table of Elements, especially titanium, it being possible also for this compound to comprise magnesium, and (b) an organometallic compound of a metal of Groups I, II or II (SIC) of the Periodic Table, especially an organo-aluminium compound. Such catalytic compositions possessing an elevated activity have been described in particular in U.S. Pat. No. 3,878,124 and U.S. Pat. No. 4,260,709.

It is also known that polymerisations and copolymerisations of alpha-olefins in which the very active catalysts described above are employed, or equivalent catalysts, can be carried out by the fluid-bed technique. These polymerisations and copolymerisations are then generally effected in a reactor with a vertical axis in which the polymer granules being formed are maintained in the fluidised state by a rising gas stream containing the olefin or olefins to be polymerised. A reactor of this kind usually comprises in its lower part a perforated or porous plate—currently called the fluidisation plate—which makes it possible to distribute within the enclosure the gas stream introduced beneath the plate by a nozzle and to maintain the polymer granules in the fluidised condition above the plate in the enclosure. A lateral evacuation pipe located above the plate makes it possible to evacuate continuously or periodically from the reactor a part of the polymer to be found there.

During the utilisation of a fluid-bed reactor of this type it may be expedient to drain in whole or in part the fluid bed contained between the plate and the level of the outlet pipe.

For example, it may be necessary to carry out such an operation when changing the quality of polymer being manufactured, in order to avoid mixing polymers of differing qualities; in such case the majority of the polymer contained in the reactor can be withdrawn from it via the outlet conduit, but the fraction of polymer remaining between the perforated plate and the outlet pipe cannot be drained in this way. It should be noted in addition that there may exist in the bottom part of the reactor, at the level of the plate and in its vicinity, zones where the polymer is not in the fluidised state. This phenomenon may result for example from the existence of mechanical reinforcements beneath the plate, which reduce the porosity of the latter in places; in these zones, in particular, the polymer may exist in the form of agglomerates of a low mobility or which are immobile.

It may also be expedient, during the actual course of a polymerisation operation, to bleed a part of the fluid bed contained in the bottom part of the reactor in order, for example, to take a sample of the polymer at this level.

In apparatus where fluid-bed reactions are carried on, for example catalytic reactions between at least one gaseous compound and at least one solid catalyst in the fluidised state, the possibility of drawing off, in whole or in part, the solid particles by using a vertical drainage tube whose top aperture is at the level of the plate and whose bottom aperture, which is occluded in the normal operating condition by a valve, is located beneath the apparatus, has already been described. A very simple drainage device of this type for the fluidised particles cannot be used just as it is for polymerisation or copolymerisation reactions carried out within the framework of the present invention, for the polymer formed on the catalitic particles would inevitably cause the clogging of the drainage tube.

The process and device according to the present invention are aimed at solving the problem of the partial or total drainage of the fluidised particles located immediately above the plate of a fluid-bed olefin polymerisation or copolymerisation apparatus.

The drainage device according to the invention is characterised by the fact that it comprises:
a vertical piping whose top aperture is located at the level of the plate and whose bottom aperature, located outside and underneath the bottom of the reactor, is occluded by a cock with a high-speed opening,
and a gas inlet tube into the said vertical piping, leading out in the immediate vicinity of the said cock.

The "vertical piping" must have an internal diameter of at least 10 and preferably at least 100 times the mean diameter of the polymer or copolymer particles forming the fluid bed. If, for example, these particles have a mean diameter of 1 mm, the internal diameter of the piping will preferably be chosen between 30 to 300 mm; an inadequate internal diameter of less than about 10 mm would involve the risk of clogging, and too large a diameter might cause difficulties either as regards the tightness of the cock or as regards turbulences in the fluid bed.

The "vertical piping" will have a length at least equal to approximately 3 times, and preferably at least equal to 5 times its internal diameter; this length is necessary in order to be able to guarantee inside this pipe, thanks to the gas inlet, a desired flow of the type known as "piston effect". Such a flow is obtained when a gaseous current having a speed comprised between 5 to 50 times and preferably approximately between 10 and 30 times the minimum gas speed which would cause fluidisation of the polymer particles in the vertical piping is introduced via the said gas inlet tube. Too low a speed would cause clogging and too great a speed would involve turbulences at the level of the fluid bed.

The said cook preferably consists of a full-flow cock such as for example a cock valve, and must be capable of being opened in a very short time, for example a period of less than 5 seconds, and preferably less than 3 seconds.

Although the cock may lead out directly into a vat in the open air, that is to say under atmospheric pressure, it is sometimes desirable, particularly when one wishes to take samples without causing any appreciable disturbances in the fluidised bed, for the said cock to lead out into a funnel of giving volume, which is itself provided with an outlet device. In this case the sampling will be effected by opening the cock quickly, the outlet device of the funnel being closed, then closing the said cock, and after any possible de-gassing, collecting the polymer via the said outlet device.

In order to ensure that the opening of the cock does bring about an evacuation of the desired quantity of fluidised polymer, it is advisable:

for the ratio of the pressure inside the reactor to that existing on the outside of the cock with high-speed opening, that is to say in the open air or in the funnel, to be greater than 5, and preferably comprised between 10 and 25, the difference between these two pressures, moreover, being greater than 0.4 MPa and preferably between 0.9 and 2.4 MPa, in the case where there is a funnel present, for there to be a certain ratio between the volume of the reactor and that of the funnel; this ratio should be comprised between 1000:1 and 10:1 and preferably comprised between 200:1 and 30:1.

Generally speaking, the volume of the funnel will be distinctly greater than the volume of the vertical piping; it is considered that the volume of the funnel should be about 8 times, and preferably 10 times greater than the volume of the said vertical piping.

When all these conditions are combined, it has been found that the high-speed opening of the cock resulted in almost immediate entrainment into the funnel of a volume of a fluidised bed more or less equal to the volume of the funnel.

The following non-restrictive examples illustrate the invention; these examples are represented in diagram form as regards the apparatus, in FIGS. 1, 2 and 3.

FIG. 1 shows:

at (1) a fluid bed polymerisation reactor which comprises in the vicinity of its bottom, at (2) a perforated or porous plate constituting the fluidisation plate, at (3) a polymerisation gas inlet tube (monomer or monomers possibly containing an inert gas and addition gases), at (4) a lateral piping located above the plate (2), which permits of continuous or periodical outlet from the reactor during normal operation.

These various elements (1), (2), (3), (4) of the fluid-bed polymerisation apparatus are practically the same in the device of the present invention.

Figure 2:
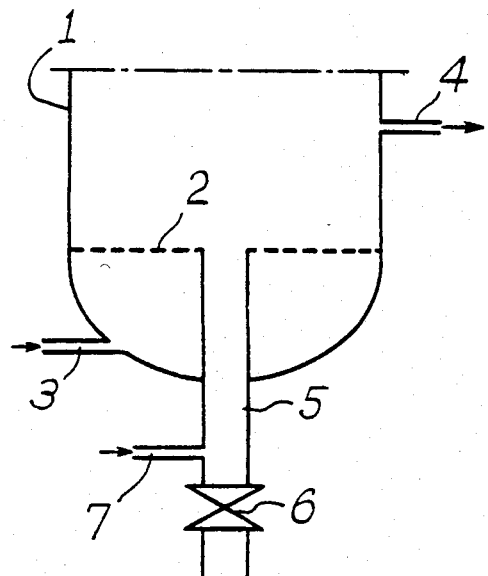
FIG. 2 is a simplified diagram of the bottom part of the said reactor (FIG. 1) comprising a device according to the invention.

The device according to the invention in FIG. 2 therefore comprises a fluid-bed reactor, a plate, a gas intake pipe and a lateral outlet; it also comprises:

at (5) the vertical piping; this piping penetrates into the enclosure via the bottom of the reactor and leads out at the level of the plate (2), preferably towards the centre of this plate, at (6), at the bottom, outside the reactor, of this vertical piping, the cock with high-speed opening, and in the vicinity of this cock, at (7) a gas intake tube.

Figure 3:
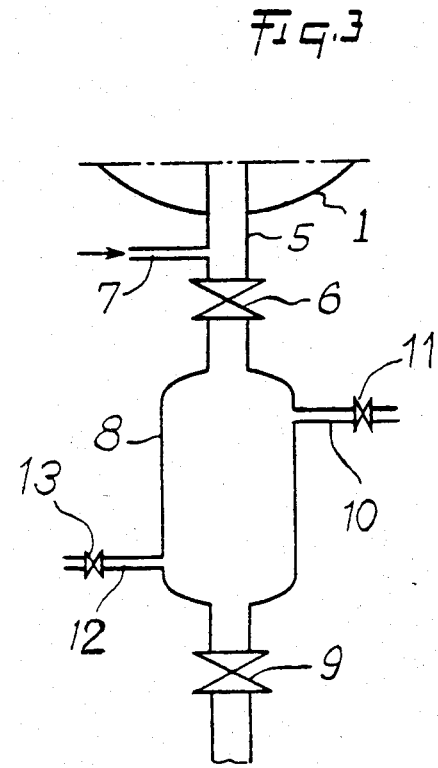
FIG. 3 is a simplified diagram of the bottom part of the said reactor (FIG. 1) comprising a device according to the invention, this device making use of a funnel.

Another device according to the invention is shown in diagram form in FIG. 3; this device differs from that of FIG. 2 by the presence in the immediate vicinity of the cock with high-speed opening (6), at (8) of a funnel which is a closed container of given volume, closed by an outlet device (9) which may be a cock with high-speed opening similar to the cock (6).

The device according to the invention is utilised in the following manner.

The polymer contained in the reactor (1) being maintained in the fluidised state by the introduction of a gas containing the alpha-olefins to be polymerised into the tube (3), a gas is continuously introduced into the tube (7); this gas may be an inert gas such as nitrogen or a gaseous mixture containing the alpha-olefins to be polymerised, at a temperature sufficiently low for the polymerisation speed of the polymer present in the tube (5) to be practically nil. The rising speed of the gas in the tube (5) must be comprised between 5 and 50 times the minimum polymer fluidisation speed in the tube (5). Preferably the rising speed of the gas in the tube (5) is such that the polymer which may be present in this tube (5) is entrained upwards by an effect known as the piston effect. In a flow of this type the heat exchanges between gas and solid are very intensive, which makes it possible to cool the polymer likely to be present in the tube (5) effectively.

In order to draw off polymer from the reactor (1), the cock (6) is opened in such a way as to place the tube (5) in communication with the funnel (8) or with any other device in which the pressure is distinctly lower than that prevailing in the reactor (1); the speed of opening of the cock (6) is selected so that the current of gas created from top to bottom in the tube (5) is not opposed by the gaseous current introduced via the tube (7).

It may be expedient, when the reactor (1) contains polymer agglomerates, to cause distrubances in the gaseous flows in the vicinity of the plate (2) by a faster opening of the cock (6) which creates an effect known as the "hunting effect". The cock (6) is kept open for several seconds in order to make it possible, for example in the case of the variant in FIG. 3, to fill the funnel (8) at least partially with polymer. After the cock (6) has been closed, the polymer present in the funnel (8) is discharged to the outside by opening the cock (9). After the cock (9) has been closed and the desired pressure has been re-established in the funnel (8) a new draw-off can be effected.

It has been found that the continuous introduction of a gas via the tube (7) does not upset the operation of the device according to the invention, whilst it makes it possible to avoid clogging of the tube (5). In fact, when the draw-off is effected when the polymer contained in the reactor (1) is at a temperature sufficient for polymerisation to be carried on, the polymer contained in the tube (5) at the moment when the cock (6) is closed might heat up appreciably under the effect of the heat given off by the polymerisation. If this heat were not very quickly carried away by a gas current, this phenomenon would cause at least superficial melting of the polymer granules and might give rise to a coagulation of the polymer inside the tube (5).

It may be expedient to provide the funnel (8) with the piping (10) and (12) provided with the cocks (11) and (13) respectively.

Immediately after filling the funnel (8) and closing the cock (6), it is in fact desirable, in order to avoid any risk of continued polymerisation in the funnel (8), to open the cock (11) so as to lower rapidly the pressure prevailing in the funnel (8), and then by opening the cock (13) and introducing an inert gas via the conduit (12) to guarantee circulation of this inert gas through the polymer powder for a sufficient period to eliminate the residues of polymerisation gaseous mixture.

The cocks (11) and (13) are then closed prior to discharging the powder contained in the funnel (8) by opening the cock (9).

As has been found after several years of operation, the device according to the invention makes it possible to achieve, under excellent operating and safety conditions, the total drainage of the fluid-bed alpha-olefin polymerisation reactors without its being necessary to interrupt the feed of fluidising gas to the reactor. In this way all risk of contaminating the installation is avoided and it can either continue operating or be started up again without delay.

EXAMPLE

Figure 1:
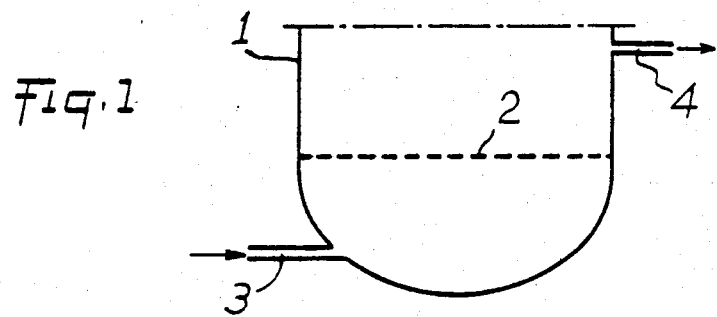
FIG. 1 is a simplified diagram of the bottom part of a fluid bed reactor used within the frame of the present invention.

Ethylene polymerisation is carried out by means of an installation comprising a fluid-bed reactor whose bottom part comprises a drainage device according to the invention, this device being associated with a funnel, in accordance with the Drawings of FIGS. 1, 2, 3.

The reactor (1) of cylindrical shape with a diameter of 40 cm, has a total volume of 2,000 liters. The lateral piping (4) which provides the outlet of the polymer in normal operation, is located 1.5 m above the level of the plate (2).

The particles of which the polyethylene powder consists and maintained in the fluidised state in the reactor have a mean diameter of 0.5 mm.

The volume of the funnel (8) is 50 liters. The length of the vertical piping (5) is 600 mm, and its internal diameter is 100 mm.

The cock (6) is of the spherical valve type. It is actuated by a pneumatic control which guarantees its full opening in about 0.5 sec.

The gas inlet tube (7) the internal diameter of which is 37 mm, is traversed continuously by a gaseous throughput of 25 m$^3$/hour approximatively, of the same composition and at the same temperature as the gas feeding the reactor via the conduit (3).

The result is that when the cock (6) is closed, the speed of the gas stream in the vertical piping (5) is approximately 0.8 m/sec., or approximately 12 times the minimum fluidisation speed of the polyethylene powder present in the reactor.

To empty the reactor, first of all the fraction of polymer powder located above the level of the outlet pipe (4) is discharged by means of this pipe.

Next one proceeds to the total drainage of the polyethylene powder contained in the bottom of the reactor, below the level of the lateral piping (4).

The pressure of 2.1 MPa existing in the reactor during polymerisation is maintained constant, and that existing in the funnel is 0.2 MPa.

The following manoeuvres are performed:

the cock (6) is opened and this cock is left open for about 10 seconds, the cock (9) and the cocks (11) and (12) remaining closed, and the gas stream arriving via the conduit (7) being maintained constant.

the cock (6) is closed again, and then in order to avoid any risk of continued polymerisation in the funnel (8), the cock (11) located on the pipe (10) is immediately opened in order to lower rapidly the pressure in the funnel of about 2.1 MPa to about 0.2 MPa, then for several minutes a nitrogen stream is circulated through the polyethylene powder contained in the funnel (8), this stream being introduced via the pipe (12) when the cock (13) is opened.

the cocks (11) and (13) are then closed again and the contents of the funnel are collected by opening the cock (9), these amounting to approximatively 50 liters of polyethylene powder.

When the funnel (8) has been emptied, the cock (9) is closed again and the manoeuvres listed above are repeated until the reactor (1) is totally drained.

I claim:

1. Process permitting the partial or total evacuation of a fluidised bed in which a polymerisation or a copolymerisation of gaseous alpha-olefin is being carried out on a solid fluidised catalyst, the said polymerisation or copolymerisation being effected in a reactor comprising in its bottom part a plate, a gas inlet situated between the said plate and the bottom of the reactor, a lateral pipe located above the said plate for the discharge of fluidised particles, a vertical evacuation piping having an opening at the level of the plate and leading into a funnel, the said vertical piping being occluded by a cock with high-speed opening, and a gas inlet tube leading into the said vertical piping between the plate and said cock, the process being characterised by the fact that:

the ratio of pressure existing in the reactor to that existing in said funnel when said cock with high-speed opening is closed, is greater than 5, the difference between these two pressures being greater than 0.4 MPa.

a quantity of gas is admitted via the gas inlet tube such that when said cock is closed, the gaseous stream in the vertical piping has a speed between approximatively 5 and 50 times the minimum speed of the gases which would cause fluidisation of the polymer particles in the said piping, said partial evacuation is carried out by periodically opening and closing the said cock with high-speed opening.

2. A process as defined in claim 1 wherein said ratio of pressure is between 10 and 25 and the difference between said two pressures is from 0.9 to 2.4 MPa.

* * * * *

UNITED STATES PATENT AND TRADEMARK OFFICE
CERTIFICATE OF CORRECTION

PATENT NO. : 4,495,337
DATED      : January 22, 1985
INVENTOR(S) : Charles Raufast It is certified that error appears in the above-identified patent and that said Letters Patent is hereby corrected as shown below:

Col. 2, line 53, "The said cook" should read --The said cock--

Col. 2, line 45, "between 5 to 50 times" should read --between 5 and 50 times--

Col. 3, line 10, "preferably between" should read --preferably comprised between--

Col. 3, line 30, "the frame of the" should read --the framework of the--

Signed and Sealed this

Thirtieth Day of April 1985

[SEAL]

Attest:

DONALD J. QUIGG

Attesting Officer  Acting Commissioner of Patents and Trademarks